Feb. 8, 1944.                    H. S. BLACK                    2,341,013
                        THERMOSENSITIVE CONTROL CIRCUIT
                              Filed July 25, 1941
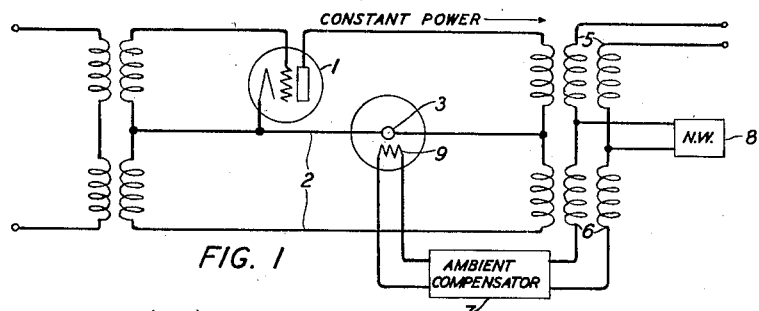
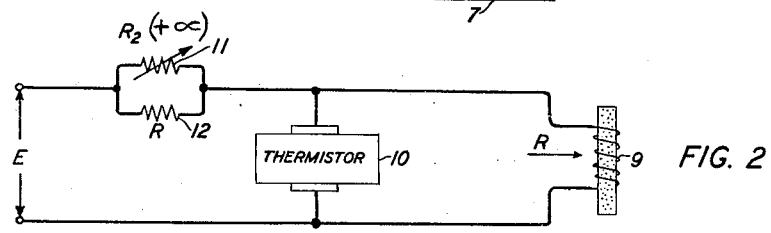
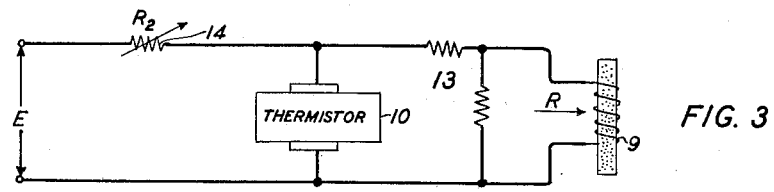
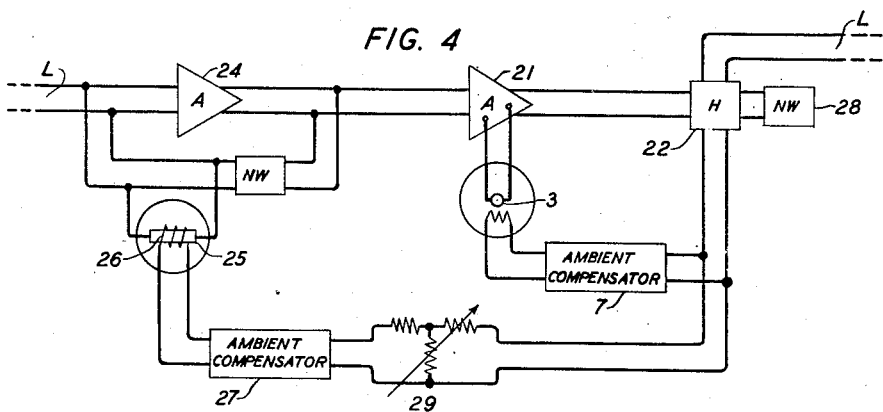
INVENTOR
H.S.BLACK
BY
N. S. Ewing
ATTORNEY Patented Feb. 8, 1944

2,341,013

UNITED STATES PATENT OFFICE 2,341,013

THERMOSENSITIVE CONTROL CIRCUIT

Harold S. Black, Elmhurst, N. Y., assignor to Bell Telephone Laboratories, Incorporated, New York, N. Y., a corporation of New York Application July 25, 1941, Serial No. 403,957

6 Claims. (Cl. 178—44)

This invention relates to electric wave transmission systems and more particularly to signaling circuits employing thermosensitive impedance elements.

Heretofore, it has been proposed to employ thermistors for various control purposes in electrical circuits, thermistors being resistance elements having a high temperature coefficient of resistance. In the practical application of these devices it is found in some cases that the resistance of the thermistor is influenced to a substantial degree by variations in the temperature of the ambient and that measures must be taken to compensate for the effect of such variations. In accordance with one known arrangement a heater is associated with the affected thermistor and the amount of heating current supplied thereto is caused to change, with every change in ambient temperature, in the sense and degree necessary to effect the desired compensation. With elements presently available fairly accurate compensation can be had by connecting the heater through a variable element responsive to changes in ambient temperature to an electric source of the constant current type. Whereas a voltage regulated source is a necessary component of many circuit organizations the constant current source ordinarily must be separately provided for the purpose described.

A principal object of the present invention is to provide an improved circuit arrangement for compensating a thermistor for the effects of variations in the temperature of its ambient.

Another and more particular object of the invention is to provide a thermistor compensating circuit adapted to operate with high accuracy when supplied from a constant voltage source.

Still another object is to provide a thermistor-controlled constant output amplifier that is substantially immune to changes in ambient temperature.

In accordance with a feature of the invention, a thermistor-controlled constant output amplifier is compensated for ambient temperature changes by a circuit that derives constant voltage from the thermistor-controlled output of the amplifier. In accordance with a related feature the control effects of current supplied to a directly heated thermistor are supplemented by variation in the temperature of an auxiliary heater that is supplied with currents that have been subjected to the control effects of the said thermistor, and more particularly in a thermistor-controlled constant output amplifier, variations in output permitted by a directly heated thermistor are caused to give rise to compensating variations in the temperature of an auxiliary heater such that output variations are substantially reduced or eliminated.

The nature of the present invention and its various features, objects and advantages will appear more fully from a consideration of the embodiments illustrated in the accompanying drawing and hereinafter to be described. In the drawing:

Fig. 1 shows a thermistor-controlled constant output amplifier in accordance with the invention;

Figs. 2 and 3 show alternative forms of the ambient compensating circuit of the Fig. 1 amplifier; and Fig. 4 shows another embodiment of the invention illustrating additional features thereof.

Referring now to Fig. 1, there is illustrated schematically a specific embodiment of the present invention comprising an electric wave amplifier the power output of which is maintained substantially constant under the control of a directly heated thermistor. The amplifier may be employed for typical example as a repeater amplifier in an automatic gain regulating system such as that disclosed in U. S. patent to J. H. Bollman No. 2,231,558, February 11, 1941, which requires a repeater that will deliver constant power output despite restricted variations in the intensity of the waves applied to the input. The amplifier shown is transformer-coupled at its input and output and may comprise a plurality of amplifying stages represented by the single amplifying discharge device 1. It comprises also a transformer-coupled negative feedback circuit 2 with a directly heated thermistor 3 connected in series near the input end of the feedback path 2. Thermistor 3 is traversed by current corresponding to the output current and proportional in intensity thereto, and assuming it to have a high negative temperature coefficient of resistance, it may be so proportioned in relation to the circuit parameters that any tendency for the output power to change gives rise through it to a compensating change in negative feedback and therefore also in the gain of the amplifier. Further details of an amplifier conforming with the foregoing description of Fig. 1 may be found in my U. S. Patent No. 2,209,955 dated August 6, 1940.

The output transformer in Fig. 1 is a multi-winding transformer connected as a hybrid coil. One pair of terminals 5 of this transformer is connected to the output terminals of the amplifier. Another pair of terminals 6 is connected to an ambient compensator 7 shortly to be described, and a balancing network 8 is connected to the mid-points of the two secondary windings, as shown, to render the compensator 7 conjugate to the output terminals of the amplifier. Preferably the output transformer is proportioned to operate as a hybrid coil with inequality ratio such that a small fraction of the amplifier ouput is delivered to the compensator 7 and the remainder is delivered to the output terminals of the amplifier.

Intimately associated with thermistor 3 is a resistance heater 9 which is supplied with heating current through compensator 7 from the output transformer terminals 6. Heater 9 may be positioned with respect to thermistor 3 either for operation as a conduction heater or for operation as a radiant heater. In either case, the heat supplied from the heater 9 to the thermistor tends to vary as the output of the amplifier tends to vary. Suppose that from some cause or other the total output power of the amplifier has increased beyond the desired constant level. This increase brings about a corresponding increase in the amount of heating power supplied to heater 9, an increase in the temperature of the heater and a slight increase in the temperature of thermistor 3. The effect on thermistor 3 is therefore in the proper sense to restore the total power output towards the desired constant value, for the increase in temperature of thermistor 3 results in a decrease in its resistance, in the loss it interposes in the negative feedback circuit and in the gain of the amplifier. Thus it is evident that whereas thermistor 3 alone tends to maintain the power output substantially constant, the auxiliary circuit including heater 9 operates to suppress such variations as thermistor 3 would otherwise permit.

In a typical example conforming with Fig. 1 with heater 9 omitted, a variation of 20 decibels in the input to the amplifier occasions a slight change in the output power of the order of 0.5 decibel. With heater 9 connected as shown, the 0.5 decibel change in output changes the voltage across the compensator by 5 per cent which, in turn, changes the temperature of thermistor 3 such amount as to effect an opposing change in the repeater gain and in the power output of 0.5 decibel. Thus the net effect of the added circuit elements is to increase the precision of output regulation as well as to extend the range of the regulator.

Although in the foregoing it is presumed that the thermal loss from thermistor 3 is constant, in practice the loss would vary in most cases with changes in the ambient temperature. To correct for this factor the ambient compensator 7 is included in the heating circuit of heater 9. Two alternative forms are illustrated schematically in Figs. 2 and 3.

Referring to Fig. 2, the voltage E applied to the compensator from the output transformer winding 6 is constant to a high degree of accuracy for it is derived from the regulated constant output of the amplifier. To translate the constant power output of the amplifier into constant voltage it is only necessary that a constant resistance be presented to the output winding 6 and this is provided by the input impedance of the compensator 7. The design of the compensator itself proceeds from the substantially constant resistance R of the thermistor heater 9 as a base. Shunted across the heater 9 is a thermistor 10 which has a large negative temperature coefficient of resistance and which is substantially unaffected in temperature and resistance by the current traversing the circuit. In series with one of the input branches of the compensator is a thermistor 11 having a positive temperature coefficient of resistance. This is shunted by a resistor 12 having a resistance R that is equal to the resistance of heater 9. For element 10 there is selected a thermistor having a temperature-resistance characteristic such that if constant current were to be supplied to the parallel combination including it and heater 9, the temperature of heater 9 would vary with ambient temperature changes in such manner as to compensate the effect of the ambient temperature changes on thermistor 3. Thermistors having the characteristics specified for thermistor 10 are available and the design procedure indicated is known to those skilled in the art. Having thus fixed on the characteristics of thermistor 10, thermistor 11 is so selected that its resistance changes with temperature in a predetermined manner with reference to the resistance changes in thermistor 10. More particularly, the two thermistor characteristics are so selected that at all temperatures of interest the product of their resistances is equal to $R^2$. Under these conditions it can be readily shown that a constant resistance is presented to the applied voltage E at all ambient temperatures for which the combination is designed. Accordingly, the current drawn from the voltage source is constant and the desired constant current is supplied to the parallel combination of heater 9 and thermistor 10.

In one aspect the ambient compensator 7 is an attenuator responsive to changes in ambient temperature. It is pertinent to observe in this connection that inasmuch as the input resistance is R the attenuator is adapted for operation in tandem with a plurality of like attenuators. For situations where a large range in ambient temperature is encountered, it is proposed in lieu of tandem operation of compensators to use a single section with the shunting resistor R removed. This is shown in Fig. 3.

The Fig. 3 circuit is the same in all respects as the Fig. 2 circuit except for the omission of shunting resistor 12 and the interposition of a resistor pad 13 between thermistor 10 and heater 9. The pad is merely to take care of manufacturing variations in the resistance R of heater 9. The temperature-resistance characteristic of thermistor 14 is so selected with reference to the corresponding characteristic of thermistor 10 that with variations in ambient temperature the current into the compensator from the constant voltage source E is substantially constant.

In Fig. 4 there is shown a thermistor-controlled constant output amplifier 21 similar to that described with reference to Fig. 1, in combination with a preamplifier 24. The latter includes a gain controlling thermistor 25 and circuit means associated therewith for manually adjusting the gain of the amplifier and also compensating for the effect that variations in ambient temperature tend to have on the thermistor 25. It is contemplated that the preamplifier may be employed in emergencies where through some fault in a preceding section of the transmission line L it may be necessary to raise the level of the signals applied to amplifier 21 to bring them within the operating range of the regulator associated therewith.

The control circuit for regulated amplifier 21 comprises a hybrid coil 22 that is connected to the output of the amplifier 21 in the manner of the Fig. 1 output transformer, and to the balancing network 28. One output connection is made from the hybrid coil 22 to the outgoing section of transmission line L and another output connection is made through a circuit which branches through ambient compensator 7 to the heater associated with the gain controlling thermistor 3 of amplifier 21. The other branch extends through a constant resistance variable attenuator 29, ambient compensator 27 to the heater 26 associated with a thermistor 25. The latter is connected in gain controlling relation in the feedback circuit of amplifier 24 and is so proportioned as to be not substantially affected by the signaling current traversing the amplifier 24. Inasmuch as compensator 7 and attenuator 29 have constant input resistances under all conditions, they are supplied with constant voltage by hybrid coil 22. With any given setting of attenuator 29, constant voltage is applied to the ambient compensator 27 hence the latter operates to supply variable heating current to heater 26 and to compensate thermistor 25 for the variable influence of changes in ambient temperature. Adjustment of attenuator 29 permits the heating current to heater 26 and the average operating temperature of thermistor 25 to be controlled at will and therefore also the gain of preamplifier 24 inasmuch as the resistance variations of thermistor 25 are translated into corresponding variations in the feedback circuit loss of the amplifier.

Although the present invention has been described largely in terms of the specific embodiments illustrated, it will be evident to those skilled in the art that the invention may be embodied in other forms within the spirit and scope of the appended claims.

What is claimed is:

1. An electric wave amplifier comprising a principal regulating means for maintaining the wave power output of said amplifier approximately constant irrespective of variations in wave power input, said principal regulating means comprising a current dependent thermosensitive impedance element that is traversed by the waves being amplified and thereby controlled in impedance, and auxiliary output controlling means comprising a resistance heater in heating relation to said thermosensitive element and means for supplying said heater with heating current from the output of said amplifier, whereby any change in the said output is accompanied by a change in the current supplied to said heater.

2. A combination in accordance with claim 1 in which said heater and current supplying means are so proportioned and arranged as to tend to reduce any change in output giving rise to a change in said heating current.

3. An electric wave amplifier comprising a first, directly heated, thermosensitive impedance element connected to be traversed by the waves being amplified and adapted to be substantially varied in resistance by the heating effect of the said waves traversing it, said thermosensitive element being connected in output controlling relation in said amplifier and so proportioned and arranged as to maintain the output of said amplifier approximately constant despite variations in the input to said amplifier, and auxiliary output controlling means comprising a resistance heater in heating relation to said thermosensitive element and means for supplying said heater with heating current from the output of said amplifier, whereby any change in the said output is accompanied by a change in the current supplied to said heater, said current supplying means including a second thermosensitive impedance element responsive to changes in ambient temperature affecting said first thermosensitive impedance element and connected to control the intensity of said heating current in accordance with said changes.

4. An electric wave translating circuit including means for regulating the wave output thereof, said regulating means comprising a directly heated thermistor traversed by the waves translated through said circuit and so proportioned that its temperature and resistance are responsive principally to variations in the intensity heating effect of the said waves traversing it, and means for separately and indirectly heating said thermistor with currents derived from the output of said circuit as so regulated.

5. In combination with a thermosensitive impedance element exposed to changes in ambient temperature, a constant resistance heater for said element, a constant voltage source connected to supply heating current to said heater, and an ambient compensating network interposed in tandem circuit relation between said source and said heater, said network comprising two thermosensitive resistance elements exposed to said changes in ambient temperature and so proportioned as to be substantially unaffected in temperature by said heating current, one of said resistance elements constituting a series branch of said network and the other constituting a shunt branch disposed between said one element and said heater, said one element and said other element having respectively positive and negative temperature coefficients of resistance that are functions of ambient temperature such that over a range of ambient temperatures the current in said series branch is substantially constant.

6. A combination in accordance with claim 5 comprising a resistance shunted across said one resistance element, said shunted resistance being equal to the resistance of said heater.

HAROLD S. BLACK.